W. F. BRINTON.
REWINDING MEANS FOR MOTION PICTURES.
APPLICATION FILED JULY 31, 1918.

1,335,817. Patented Apr. 6, 1920.
3 SHEETS—SHEET 1.

WITNESSES
Howard D. Orr.
H. J. Chapman.

INVENTOR,
William F. Brinton,
BY
C. G. Siggers.
ATTORNEY

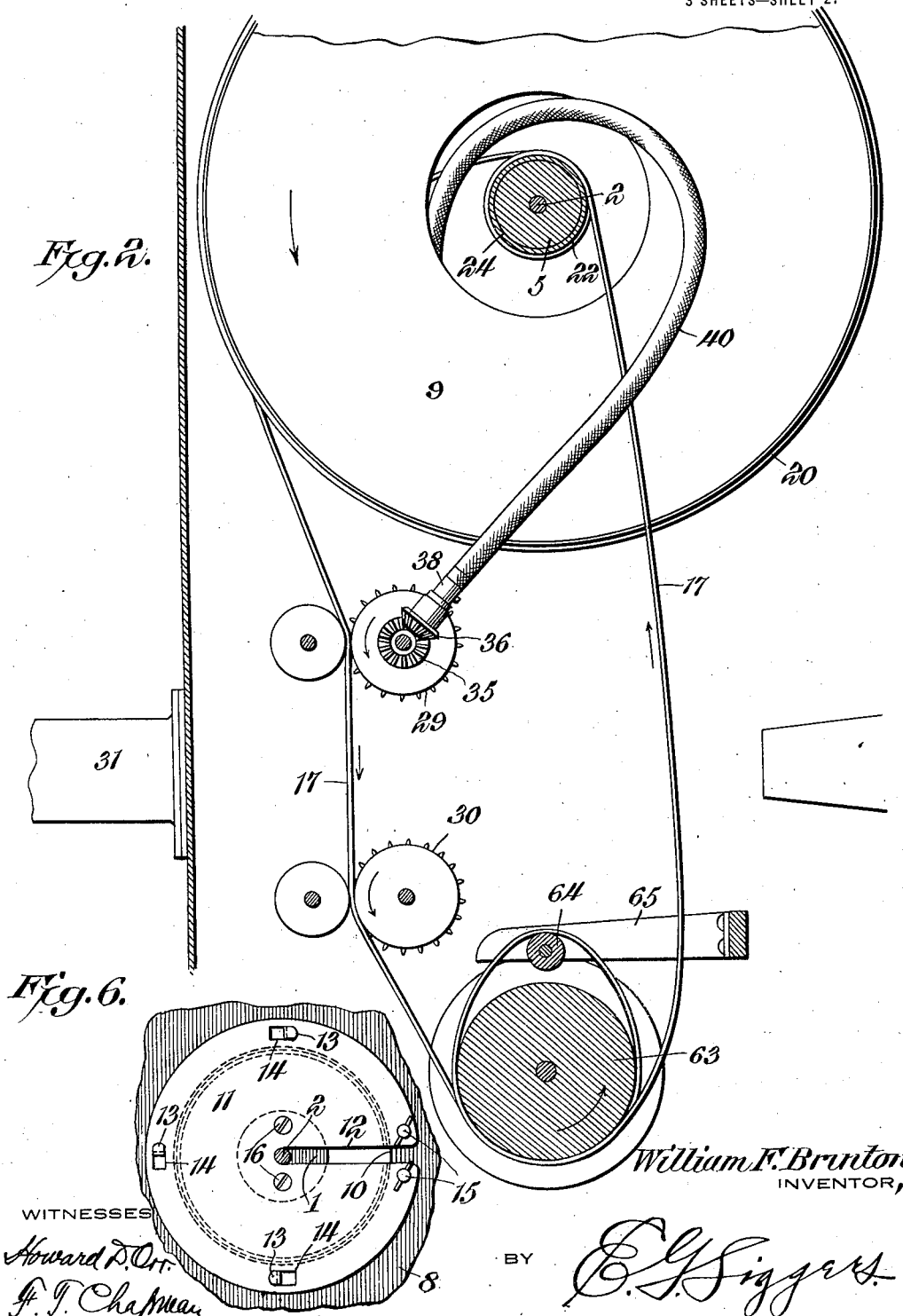

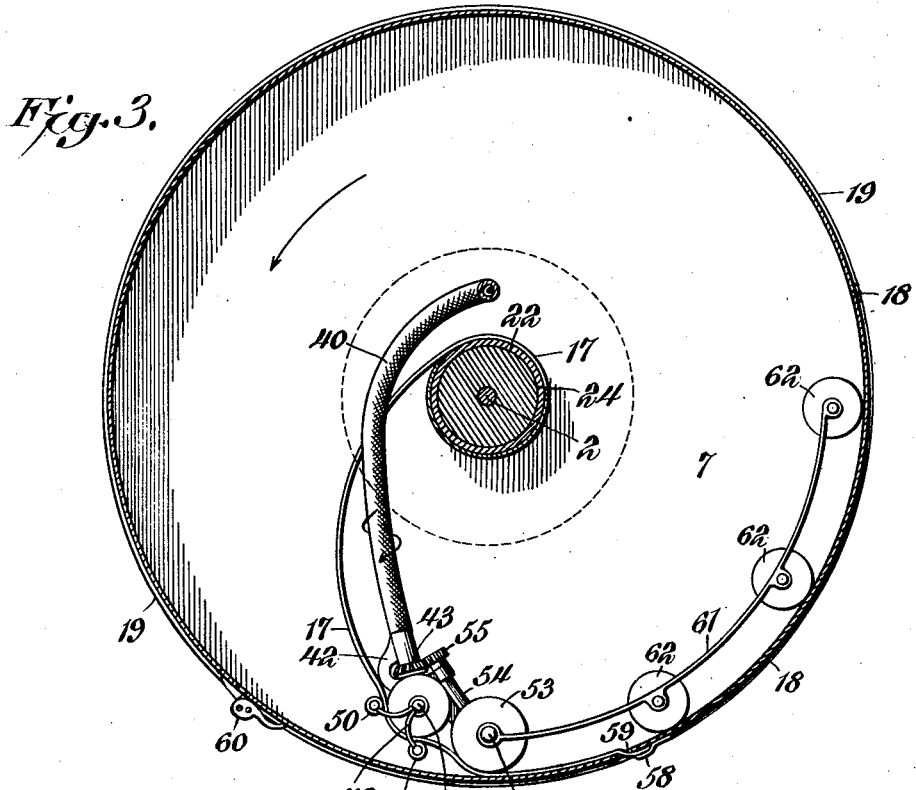
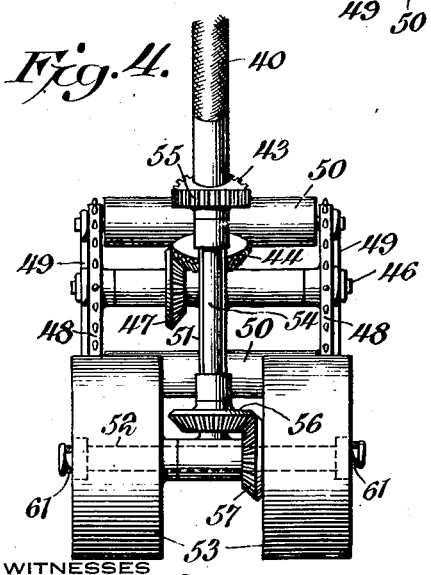
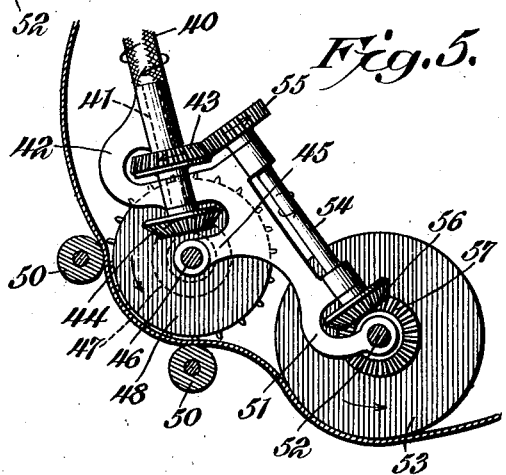

UNITED STATES PATENT OFFICE.

WILLIAM F. BRINTON, OF WASHINGTON, IOWA; INA BRINTON, GEO. H. BRINTON, AND C. M. KECK EXECUTORS OF SAID WILLIAM F. BRINTON, DECEASED.

REWINDING MEANS FOR MOTION-PICTURES.

1,335,817.  Specification of Letters Patent.  Patented Apr. 6, 1920.

Application filed July 31, 1918. Serial No. 247,563.

*To all whom it may concern:*

Be it known that I, WILLIAM F. BRINTON, a citizen of the United States, residing at Washington, in the county of Washington and State of Iowa, have invented a new and useful Rewinding Means for Motion-Pictures, of which the following is a specification.

This invention has reference to rewinding means for motion pictures, and its object is to provide means whereby a motion picture film as unwound in the course of projecting the pictures is automatically rewound with the pictures always in the same order so that the pictures may be projected with the rewound reel by taking the film off of the reel from the outside inwardly.

It has heretofore been proposed to rewind motion picture films so that they may be projected immediately without the necessity of an intermediate rewinding to restore the order of pictures the same as in the original reel. Such rewinding devices have been of a character to necessitate taking the film from the rewound reel from the inner portion first so that the order of pictures will properly show upon the screen.

In accordance with the present invention, the film taken from a properly wound reel is wound up on another reel from the peripheral portion toward the central portion so that the order of the pictures is not disturbed by the rewinding operation, and the film, when again used for projection, is taken from the outside of the wound film, as is customary. The result is that as soon as the film is taken from a reel in the course of projecting the pictures and is rewound upon the second reel it is ready for immediate re-projection with no further change than the shifting of the rewound reel into the place of the exhausted reel. This last-named operation is facilitated by having both reels on the same axis, requiring a shifting no greater than the thickness of reel and the readjustment of certain driving mechanism.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Fig. 2 is a side elevation, with some parts in section, of the structure shown in Fig. 1.

Fig. 3 is a section through that one of the reels at the time constituting the rewinding reel.

Fig. 4 is an elevation of a portion of the rewinding mechanism.

Fig. 5 is a central section of the structure shown in Fig. 4, looking toward the right, some parts being shown in elevation.

Fig. 6 is a view, partly in elevation and partly in section, of a cover plate, but drawn on a smaller scale than the other figures.

Figure 1:
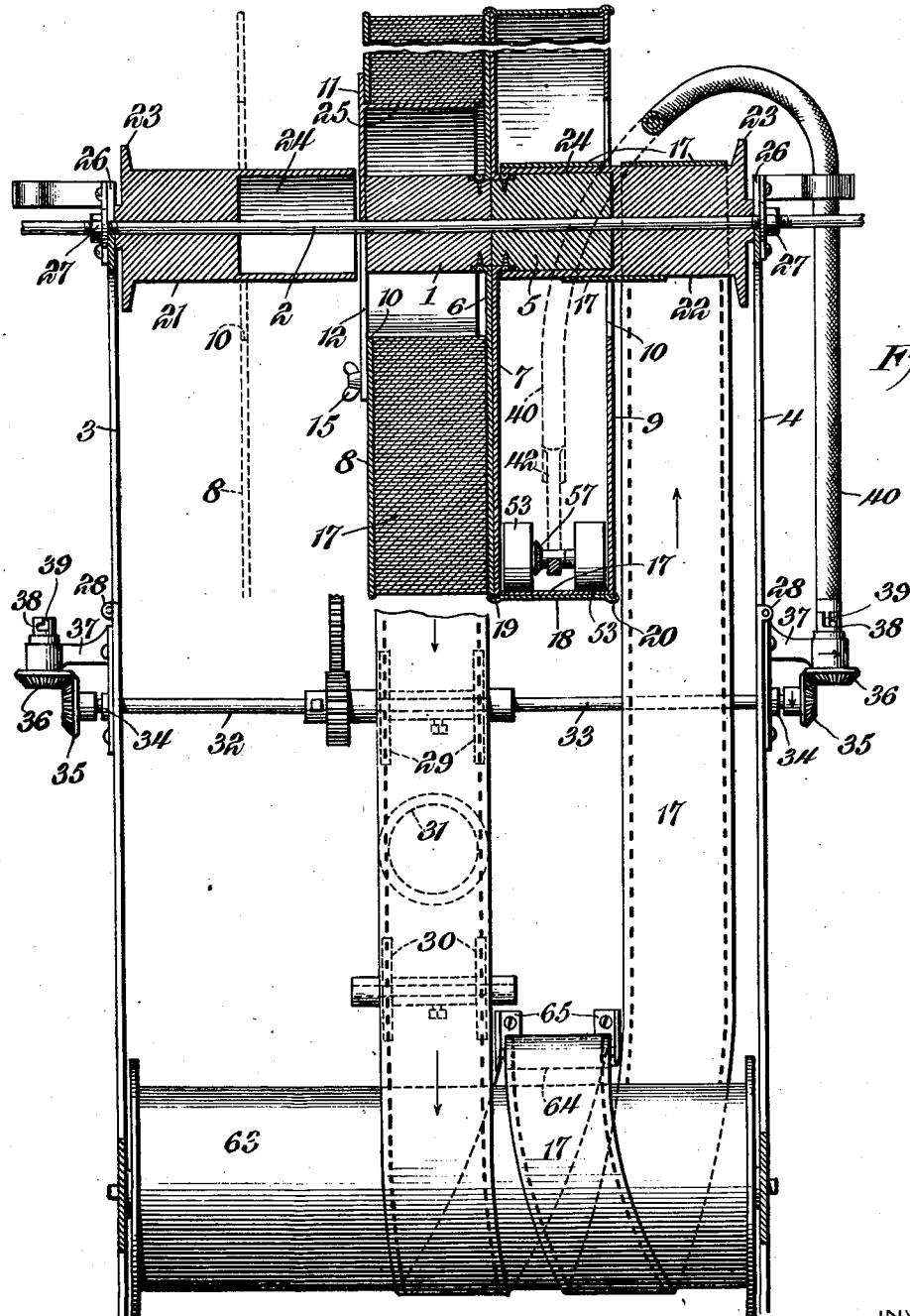
Figure 1 is a diametric section, with some parts in elevation, of the invention, showing so much of a motion picture machine as is necessary for an understanding of the invention.

Referring to the drawings, there is shown a hub 1, which may be made of wood or other material suitable for the purpose, and this hub is mounted on an arbor 2 carried at the ends upon supports 3, 4 respectively, in which the arbor may be fixed. There is also provided another hub 5 similar to the hub 1 and mounted on the arbor 2. Fast to one end of the hub 1 is a face plate 6 and fast to the adjacent end of the hub 5 is another face plate 7. The two hubs are arranged to be brought together in end to end relation so that the face plates 6 and 7 may be brought into contact in face to face relation. There are also provided other face plates 8 and 9 respectively, each having a central opening 10 of considerably larger diameter than the hub 1 or 5. In conjunction with the face plate 8 or 9, as the case may be, there is another plate 11 with a radial slot 12 permitting the plate 11 to be applied to the face plate 8 or 9 so as to be concentric therewith, and the plate 11 may have tongues 13 arranged to enter slots 14 in the face plate 8 or 9 close to the opening 10. It will be understood, of course, that the location of the tongues and slots 13 and 14 may be reversed from that described, the purpose being to provide a temporary lock for the plate 11 by turning the plate about its center point after application to the face plate 8 or 9, and then thumb screws 15 may be used to fasten the plate 11 to the face plate 8 or 9. In order that the plate 11 may be made fast securely to the hub 1 or 5, as the case may be, screws 16 may be used for the purpose, whereby the face plate 8 or 9 forms one end of a film reel, the other side of which is formed by the face plate 6 or 7 as the case may be.

Considering the reel provided with a hub 1 as supporting a wound-up film 17, as indicated in Fig. 1, the other reel then immediately adjacent to the loaded reel is formed of the face plate 7 fast to the hub 5 and the face plate 9, which, however, is not supported by the plate 11 but is otherwise supported. In order to complete the second reel or drum there is provided a rim 18 with beads 19, 20 at opposite edges. These beads are so shaped that the bead 19 will engage over the peripheries of the juxtaposed face plates 6 and 7 while the bead 20 engages over the periphery of the face plate 9, spacing it a proper distance away from the face plate 7 and holding it in concentric relation to the hub 5 and spindle 2.

Mounted on the spindle 2 are two rollers 21, 22 respectively, which rollers may be made of wood or other suitable material, each with an outstanding flange 23 at one end and at the other end axially hollowed out to form a chamber 24 which will telescope over the hub 1 or 5 as the case may be. The spindle 2 is long enough to permit the location of the two reel drums on the spindle with one roller telescoped over the hub of one of the reel drums and the other to one side of the other hub. In Fig. 1, the hub 1 is shown as withdrawn from the chamber 24 of the roller 21 and the hub 5 is shown as housed or telescoped into the chamber 24 of the roller 22.

In order to support the wound-up film 17 in the reel drum carrying it, the plate 11 carries a substantially cylindrical spring sleeve 25 fast at a suitable point on the inner face of the plate 11 but otherwise free therefrom so that the sleeve 25 will contract to accommodate rolls of film of different internal diameters and hold such film approximately concentric with the axis of rotation, that is, with the spindle 2.

In order to receive the spindle 2 the supports 3 and 4, which may be upright, have their upper ends provided with recesses 26 into which the spindle may drop, and to prevent longitudinal movement of the spindle without interfering with its free rotation the ends of the spindle are provided with nuts 27 which may be easily applied or removed as required. Each support 3 and 4 has a hinge joint 28 by means of which the upper portion of the support may be turned down out of the way after the removal of the nut 27, thereby permitting the removal of the roller 21 for access to the plate 11 and such operations as may be necessary.

The usual feeding toothed wheels 29 and 30 on opposite sides of the optical axis of the projecting lens 31 are indicated in Figs. 1 and 2 without any attempt to illustrate the film propelling mechanism common to motion picture projecting machines. The toothed propelling device 29' carries arbor extensions 32, 33 respectively, at opposite ends, these extensions having journal bearings 34 in the respective supports 3 and 4 and terminating in bevel gear wheels 35. Meshing with each gear wheel 35 is another gear wheel 36 supported by a bracket 37 which may in turn be carried by the support 3 or 4 as the case may be. Each bevel gear wheel 36 has its hub provided with a receptacle 38 shown as having a bayonet notch 39 therein, but this bayonet notch is taken as indicative of any means for securing the corresponding end of a flexible shaft 40 thereto.

The end of the shaft 40 remote from that to be attached to either one of the gear wheels 36 is made fast to a short shaft 41 carried by a bracket 42 and the shaft in turn carries two bevel gear wheels 43, 44, best shown in Figs. 3, 4 and 5. The bracket 42 has an arm 45 in which is mounted a shaft 46 provided with a bevel gear wheel 47 meshing with the gear wheel 44. The outer ends of the shaft 46 carry pin or sprocket wheels 48 of the type employed in motion picture machines to drive the film. The outer ends of the shaft 46 carry spring brackets 49 in turn carrying spaced rollers 50 acting as pressure rollers for maintaining a short length of film in contact with the wheels 48.

The bracket 42 has a still further extension 51 carrying a short shaft 52 on which are mounted spaced rollers 53, these rollers being spaced apart in the direction of the length of the shaft 52. Also mounted in the bracket 42 is a countershaft 54 having a gear wheel 55 at one end meshing with the bevel gear 43 and at the other end carrying a bevel gear 56 meshing with another bevel gear 57 fast on the shaft 52.

The flexible shaft 40 with the parts carried thereby is introducible through the opening 10 of the face plate 8 or 9, as the case may be, into the interior of the film reel into which the film is to be rewound and the rollers 53 will then engage the film and hold it against the inner face of the rim 18, the end of the film having been secured to the rim 18 by a clip 58 on the outside of the rim and accessible from the inner face of the rim by an opening 59 therethrough. In order that the rim may be secured tightly to the face plates of the reel drum to which the rim is applied, the rim is divided at one point and provided with a clamp 60 of any approved or special type.

Carried by the ends of the shaft 52 are supports 61, which may be made of more or less spring material, and these supports carry a series of rollers 62. It will be understood, however, that the supports 61 and rollers 62 may under some circumstances be omitted.

When the film has passed the optical axis of the lens 31 and has left the propelling device 30 it is carried about an elongated roller 63 which may be in turn carried by the supports 3 and 4, the roller being journaled to turn freely about its longitudinal axis. The film 17 is carried about the roller 63 and then about another roller 64 supported by brackets 65 at a short distance from and preferably above the roller 63, the brackets 65 being shaped to serve as division members or fingers between successive turns about the roller 63, thereby preventing the edges of the film from contacting with each other. The turns about the roller 63 are loose turns and the film is carried from the roller 63 over one of the rollers 21 or 22, as the case may be, the showing of the drawings indicating the roller 22 as the one about which the film is caused to travel. From the roller 22 the film is directed through the opening 10 of the first plate 9 into the interior of that drum then constituting the rewinding drum and the end of the film is made fast to the clip 58 as already described. The rollers 53 rest upon and hold the film against the inner face of the rim 18 while the film and roller carrying the rim 18 are propelled by the film-engaging mechanism represented by the sprocket wheels 48 and between rollers 53, said sprocket wheels 48 and rollers 53 and parts carrying them constituting what may be termed a packer carriage.

The propelling sprocket wheels 48 in the rewinding drum impart the same speed to the film as occurs in the withdrawing of the film from the loaded reel, so that the rewinding proceeds without hitch in conformity with the unwinding.

When the film is unwound from a reel, in the course of projecting the picture, it is simultaneously rewound upon a second reel which may be rotating about the same axis as the first reel, the rewinding taking place at the same speed as the unwinding and in the same order, that is, the unwinding proceeds from the peripheral portion of the wound film toward the center thereof and the rewinding takes place from the peripheral portion of the film being rewound toward the center thereof.

When the film has been completely rewound upon the second reel the nut 27 engaging the support 3 is loosened and the hinged end of the support is dropped out of the way, after which the roller 21 may be removed and the plate 11 unfastened and taken off, the packer carriage having in the meantime been removed from the reel carrying the rewound film. The plate 11 is secured to the face plate 9 and hub 5 after the reels have been moved so that the roller 22 is no longer in the way, and then the roller 21 is moved along the arbor 2 until the hub 1 is housed in the chamber 24 of the roller 21. With the plate 11 in place on the reel containing the rewound film the roller 22 is of course withdrawn from the hub 5. Now, the reels and arbor are replaced upon the supports 3 and 4 and properly secured and the packer carriage is introduced into the reel from which the film was unwound, the flexible shaft 40 having been removed from the hub 38 of the gear wheel 36 to which it was first attached and made secure to the hub 38 of the other gear wheel 36. Furthermore, the rim 18 is unlocked from engaging relation to the face plates of the reel on which the film has been rewound and is placed upon the reel from which the film was unwound. The parts are then assembled in proper position to again project the pictures of the film but with the film traveling from the reel on which it was rewound back onto the original reel, this being possible on account of the manner of rewinding without the necessity of intermediate idler rewinding. This is because the rewinding is such as to cause the film to be on the reel in the same order as it was before the initial unwinding.

By the invention the rewinding is always in the same order as the unwinding, that is, the outermost turns and unwinding are always placed in rewinding in the same order so that these turns are again the outermost turns and the wound film is at once in condition for proper projection.

The two reels employed become alternately the projecting and the rewinding reels and being placed side by side produce a compact structure, all of which may be included in a relatively small casing, such casing, however, being omitted from the drawings. When the reels are associated one of the reels has the film already wound thereon in proper order for projection, and consequently, since the reels are side by side, it is only necessary to shift the rewound reel into the optical axis with the exhausted reel shifted to one side of the optical axis of the projecting machine and then make the necessary adjustments of the packer carriage and the threading of the film through the propelling mechanism, such operation taking but a very few minutes and capable of performance much quicker than rewinding the film after having been wound upon the receiving reel for, by the invention, the receiving reel becomes at once the projecting reel.

The invention is particularly applicable for films of great length, say of several thousand feet in extent, so that the ordinary rewinding, even though done rapidly, consumes considerable time. By this invention no time whatever is lost in rewinding because such rewinding is automatically performed simultaneously with the projection of the pictures and nothing remains but to replace the exhausted reel by the rewound reel with such adjustments as are always necessary, the time saved being represented by that consumed in rewinding a reel on which the film is reversed, as occurs in the ordinary procedure in motion picture projection.

The invention makes it possible to ship the filled reels back to the supply house without rewinding and with the films in proper order on the reel. Ordinarily all films must be rewound before they can be again used. With the invention, this procedure is avoided.

What is claimed is:—

1. A rewinding means for motion picture films, comprising interchangeable reels mounted on a common arbor and having means for securing them together for final rotation in the same direction, and means for causing the inside turns of the unwinding film to become the outside turns of the rewound film in the same order as the unwinding film.

2. A rewinding means for motion picture films, comprising interchangeable, juxtaposed, connected and axially related receptacles, one for a wound film and the other for rewinding the film as unwound from the first receptacle, and means for causing the outer turns of the unwinding film to become the outer turns of the rewound film in the same order as the unwinding film.

3. A rewinding means for motion picture films, comprising a single reel structure with closely associated reels, and means for unwinding the film from the outside inwardly of one reel and rewinding it on the other reel from the outside inwardly in the same order.

4. A rewinding means for motion picture films, comprising a single reel structure composed of two associated reels arranged at substantially the same height with means for taking a wound film on one reel from the outside inwardly and depositing the same film in the second reel simultaneously with the unwinding from the first reel and with the turns progressing from the outside inwardly in the second reel, whereby the outside turns of the film on the second reel when completed are in the same order as they were in the first reel.

5. A rewinding means for motion picture films, comprising two connected reels arranged side by side to turn simultaneously about the same axis, and means for feeding the outside layers of a film taken from the first reel into the second reel with the order of depositing the film in the second reel agreeing with the order of taking the film from the first reel.

6. A motion picture rewinding device, comprising a pair of juxtaposed synchronously rotatable film reels located at substantially the same level, means common to both reels for connecting them together, and means for taking the outermost turn of a loaded reel and directing it onto the empty reel with each depositing turn interior to the immediately preceding one.

7. A motion picture rewinding device comprising a pair of juxtaposed separably connected rotatable film reels, and means for transferring the film from one reel to the other with the order of unwinding and winding both proceeding toward the center of the reel.

8. A rewinding means for motion picture films comprising a pair of reels, each composed of a hub and a face plate fast to the hub at one end of the latter, another face plate for each reel, and a rim portion common to the reels for joining either one of the second-named face plates to both of the first-named face plates in spaced relation thereto.

9. A rewinding means for motion picture films comprising a pair of reels, each composed of a hub and a face plate fast to the hub at one end of the latter, another face plate for each reel, and a rim portion common to the reels for joining either one of the second-named face plates to both of the first-named face plates in spaced relation thereto, said rim portion having its continuity interrupted and at the meeting edges being provided with clamping means for holding it tightly about the reel to which it is applied.

10. A rewinding means for motion picture films comprising a pair of reels, each composed of a hub and a face plate fixed to one end of the hub, another face plate for each reel, a rim portion interchangeable between the reels and having its circumferential continuity broken, said rim portion being provided with clamping means at its meeting ends for securing it tightly to the fixed face plates of the two reels and to one of the other face plates, and another plate interchangeable with relation to the second-named face plates and provided with means for securing it to either of the second-named face plates, the latter each having a central passage to be covered by the last-named plate.

11. A rewinding means for motion picture films, comprising two reels in side by side relation and each having a face plate at the side toward the other reel, other face plates for the reels for location in spaced relation to the first-named face plates, and a rim for embracing the margins of both the first-named plates and one of the other face plates to form a rewinding reel.

12. A rewinding means for motion picture films comprising two reels in side by side relation and each having a face plate at the side toward the other reel, other face plates for the reels for location in spaced relation to the first-named face plates, and a rim for embracing the margins of both the first-named plates and one of the other face plates to form a rewinding reel, the rim being provided with edge beads for engaging over the peripheries of the face plates to which it is attached.

13. A holding and rewinding means for motion picture films comprising a pair of reels, each composed of a hub with a face plate fast thereto, the face plates being arranged adjacent to each other, another face plate for each hub, a spindle or arbor on which the hubs are mounted, a roller for each reel and mounted loosely on the spindle, a removable rim for joining the face plates fixed on the respective hubs and spacing therefrom and joining thereto the other face plate of one of the reels, and a packer carriage adapted to the interior of the reel having the rim thereon and provided with film actuating means, whereby a film mounted in the other reel may be unwound therefrom and deposited against the rim of the reel containing the packer carriage for the winding of the film against the rim with the winding progressing from the rim inwardly.

14. A rewinding means for motion picture films comprising a pair of reels mounted on a common axis with either reel adapted to constitute the holding reel for a roll of film, a rim member for application to one of the reels, and a packer carriage for introduction into that reel provided with the rim member, said packer carriage comprising rollers for holding the film against the interior of the rim and against each succeeding inner turn as the roll of film progresses from the outside inwardly, said packer carriage also having sprocket wheels for engaging the film, and a driving member for receiving power from outside of the reel.

15. A rewinding means for motion picture films comprising associated reels, an arbor common to the reels and extending beyond opposite sides thereof, rollers on the arbor on opposite sides of the associated reels, a rim for application to either reel with the other reel constituting a holding reel for a roll of film, and a packer carriage adapted to the interior of the reel at the time provided with the rim and having driving means for the film and holding means for engaging the inner face of the film whereby a film being unwound from the film roll mounted on one reel is deposited in the second reel with the turns progressing from the outer portions of the reel inwardly.

16. A rewinding means for motion picture films comprising associated reels, an arbor or spindle common to the reels and extending beyond opposite sides thereof, rollers on the arbor on opposite sides of the associated reels, a rim for application to either reel with the other reel constituting a holding reel for a roll of film, and a packer carriage adapted to the interior of the reel at the time provided with the rim and having driving means for the film and holding means for engaging the inner face of the film, whereby a film being unwound from the film roll mounted on one reel is deposited in the second reel with the turns progressing from the outer portions of the reel inwardly, said rewinding means also including a direction-changing roller for a loop of the film between the unwinding reel and the rewinding reel.

In testimony, that I claim the foregoing as my own, I have hereto affixed my signature.

WILLIAM F. BRINTON.